Patented May 30, 1950

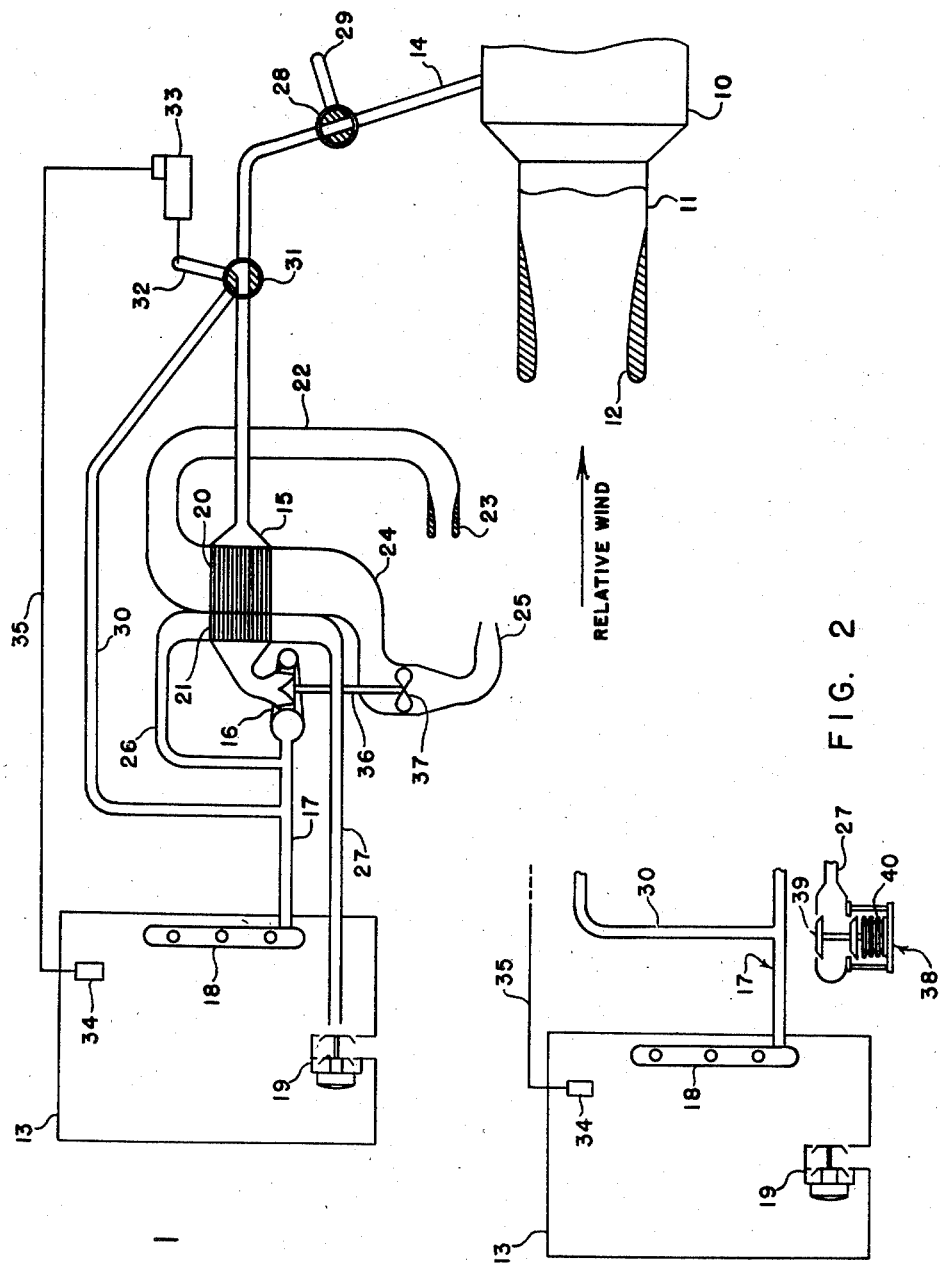

2,509,899

UNITED STATES PATENT OFFICE 2,509,899

AIRCRAFT AIR CONDITIONING SYSTEM

Homer J. Wood and Horace R. Alexander, Los Angeles, Calif., assignors to The Garrett Corporation, Los Angeles, Calif., a corporation of California Application February 25, 1946, Serial No. 649,932

15 Claims. (Cl. 62—136)

This invention relates to air conditioning systems for aircraft. More particularly it relates to a system for cooling the ventilating air introduced into the cabin of a pressurized, high speed, high altitude aircraft.

In aircraft which are intended to fly at speeds of say, 400 M. P. H. and over, the problem of cooling cabin ventilating air is one which must be considered. At any air speed the skin of a moving vehicle becomes heated to some extent by the compression due to acceleration imparted to the boundary layer of the air stream or relative wind passing over it, but in the case of very high speed aircraft, the effect may be of such magnitude that, if the ambient atmospheric temperature is already high, as on a hot summer day, the cabin temperature may be increased until it becomes unbearably hot for any personnel therein. In addition to this heating of the skin, any air introduced into the moving aircraft from the ambient atmosphere will be accelerated, and will be compressed by such acceleration, also causing a rise in the temperature of the cabin. Additionally, of course, if pressurization is employed, the cabin air may be mechanically compressed by a supercharger or other means, and such compression necessarily also entails a rise in air temperature.

Expressed mathematically, the temperature rise in degrees Fahrenheit occasioned by the relative motion between the aircraft and the atmosphere is equal to 1.8 $V^2$, where V is the relative air speed in units of 100 miles per hour. For example, in an aircraft traveling at a speed of 500 M. P. H. with respect to the ambient atmosphere, the adiabatic temperature rise due to ram would be $1.8 \times 5^2 = 45°$ F., and the cabin air under such conditions would be raised from 120° F. to 165° F., a temperature much too high for personnel to bear for any appreciable length of time.

For physiological reasons, it is customary to maintain the air within the cabin of high-altitude aircraft at a super-atmospheric pressure when flying above a certain prescribed altitude. This is usually accomplished by making the cabin substantially airtight and supplying compressed air to it from an engine-driven supercharger, or from any other suitable source. Continual renewal of cabin air is obtained by permitting its escape to the ambient atmosphere through an opening in the cabin wall, and the desired cabin pressure is usually maintained by controlling the outflow through the opening by means of a pressure-regulating valve.

A typical flight plan for a pressurized aircraft would call for the maintenance of substantially ambient atmospheric pressure in the cabin until the plane reached an altitude of say 8,000 feet, then a super-atmospheric cabin pressure above that point. Pressure control valves which will accomplish this are well known in the art, and one is shown, for example, in the application of James M. Kemper, Serial No. 556,790, filed October 2, 1944, now Patent No. 2,463,491 granted March 1, 1950.

According to the present invention, barometrically compensated means are provided for regeneratively cooling the cabin air in a pressurized aircraft in accordance with the variation in demand upon such a system entailed by variations in the altitude of the aircraft.

Accordingly, it is an object of the invention to provide a system for pressurizing and cooling the cabin of a high speed aircraft.

It is another object of the invention to provide an air conditioning system for very high speed aircraft which is highly efficient in performing its function and which entails a minimum drag upon the aircraft wherein it is installed.

Still another object of the invention is to provide an air conditioning system for aircraft which is simple in operation, light in weight and entails a minimum of equipment.

Still another object of the invention is to provide a cabin air conditioning system which will cool and pressurize the cabin of an aircraft and which is regenerative in its operation to entail a minimized drag upon the aircraft for a given cooling capacity. It is a further object to provide compensation of the regenerative operation of such a system for variations in the altitude of the aircraft.

Other objects and advantages of the invention will become apparent as the disclosure proceeds.

In the drawing, wherein like reference numerals indicate like parts throughout:

Figure 1 shows a schematic diagram of an aircraft cooling and pressurization system according to the invention.

Figure 2 shows an alternative manner in which barometric compensation may be provided in the system disclosed in Figure 1.

Referring to Figure 1, there is shown the system as applied to a jet-propelled aircraft provided with a gas turbine type, thermal jet engine, having a combustion air compressor 10 supplied with air through an intake duct 11, which may be provided with a ram intake opening 12. In order to pressurize the aircraft cabin 13, air is bled from the compressor of the jet engine by means of a supply duct 14, which leads to a heat exchanger, generally indicated at 15, and thence to an expansion or cooling engine 16, preferably, though not necessarily, a turbine as indicated. A discharge duct 17 extends from the expansion turbine to a distribution outlet 18 in the cabin of the aircraft.

In order to regulate the pressure of the air maintained in the cabin and to provide for its flow therethrough for ventilation purposes, a pressure-regulating outflow valve 19 is provided in a wall of the cabin and permits controlled escape of air to the ambient atmosphere. The valve disclosed in the aforementioned application of James M. Kemper is suitable for the purpose, but other cabin pressure control valves are known in the art and can be used.

The cabin air passing through heat exchanger 15 is cooled by heat exchange with the coolant air from the ambient atmosphere also passing through the exchanger in heat transfer relationship thereto. Any suitable exchanger or exchangers may be employed for the purpose, as will be apparent to those skilled in the art. The one indicated is a dual exchanger and is divided into a primary section 20 and a regenerative section 21. An intake duct 22 leads to the primary section of the heat exchanger and is provided with an intake opening 23, which may be directed into the relative wind as shown, or to a region of relatively high pressure in the flow of air over the body of the aircraft. A discharge duct 24 extends from the primary section of the exchanger to a discharge nozzle 25 directed to the ambient atmosphere rearwardly of the direction of flight of the aircraft.

From the turbine discharge duct 17 a branch duct 26 extends to the regenerative section 21 of the heat exchanger. A discharge duct 27 leads from the regenerative section to a discharge opening directed into the cabin and discharging in proximity to the outflow valve 19, as shown.

The supply duct 14 is provided with a shut-off valve 28 operable by means of a lever 29. A by-pass duct 30 extends past the heat exchanger and expansion turbine and leads into the turbine discharge duct 17, as shown. The by-pass duct is controlled by a Y valve 31 operable by means of a lever 32 which is actuated by an electrically controlled servomotor 33. The operation of valve 31, which selects the admission of air to either the heat exchanger 15 or the by-pass duct 30, or to both, as may be desired, is controlled by a cabin temperature thermostat 34 electrically connected to the servomotor as indicated at 35.

The expansion turbine 16 is provided with a shaft 36 which extends into the discharge duct 24. On the end of the shaft a fan 37 is provided which absorbs the energy output of the turbine and serves to induce or aid the flow of coolant air across the primary section of the heat exchanger. The primary coolant air is discharged to the ambient atmosphere through rearwardly directed nozzle 25, where some jet thrust may be recovered. If properly proportioned the primary coolant circuit can be operated with little or no net pressure drop across it.

In the operation of the system depicted in Figure 1, air for the pressurization of the cabin is extracted from the jet engine compressor 10 and is conducted by means of duct 14 to the primary section 20 of the heat exchanger 15, where it is initially cooled by air from the ambient atmosphere. From the primary section the air passes into the regenerative heat exchanger section 21, and thence to the turbine 16, where it is further cooled by expansion and the extraction of work energy. After expansion and cooling in the turbine, part of the air is discharged into the cabin through the outlet 18, and part of it is directed back through duct 26 and the exchanger section 21 to regeneratively cool the air incoming through the exchanger. The ventilation air is thus cooled initially in the primary section of the heat exchanger, then is further cooled in the regenerative section and the turbine, and then is introduced into the cabin. The pressure in the cabin is controlled by the outflow valve 19, which opens or closes to permit more or less air to escape from the cabin in order to maintain the desired pressure, yet permit the continuous supply of fresh conditioned air.

Because of the fact that there is always a certain amount of leakage of air from the cabin of a pressurized aircraft, and since the size of the leakage paths is substantially fixed, the demand for pressurization air will tend to increase as the aircraft climbs and the pressure difference between the cabin and the ambient atmosphere increases. In order to insure an adequate supply of cabin air at all altitudes, duct 27 is directed to discharge into the cabin as indicated, and at a region in proximity to the outflow valve 19. Thus the discharge pressure of the regenerative cooling circuit is always substantially the same as cabin pressure. This arrangement insures that the primary function of supplying cabin pressurization air will be fulfilled without loss of air out through the regenerative cooling circuit.

The air from the regenerative circuit will be at a higher temperature than the air distributed to the cabin from the outlet 18, and if not taken into account, this would tend to impair to some extent the desired cooling of the cabin air. This is mitigated, however, by disposing duct 27 within the cabin to discharge in proximity to the outlet valve, and since the relatively warm regenerative cooling air will be entrained in the general flow of cabin air toward and through the outlet valve 19, the heating up of cabin air to any degree uncomfortable to personnel therein will be prevented.

In the alternative arrangement of the system disclosed in Figure 2, the discharge from the regenerative section of the heat exchanger through duct 27 is maintained at approximately cabin pressure by means of a barometric valve 38 discharging coolant air from the duct to the ambient atmosphere rather than to the cabin. The valve 38 consists of a balanced, double poppet 39 actuated by an evacuated spring bellows 40 exposed to the ambient atmosphere. One end of the bellows is fixed and the other end is attached to the poppet 39. Since the bellows expands or contracts with variations in the external pressure upon it, the valve poppet 39 is positioned to vary the discharge of air from duct 27 in accordance with the pressure of the ambient atmosphere, and this compensates the discharge from the duct for variations in the altitude of the aircraft. If desired, the bellows may be so chosen in its range of operation that the flow from duct 27 and the operation of the regenerative cooling circuit may be shut off entirely above a desired altitude, when the temperature of the atmosphere and flight conditions permit operation of the system without the necessity for the additional cooling provided by the regenerative circuit.

In the system as disclosed in either Figure 1 or Figure 2, the temperature of the cabin is regulated by varying the amount of air which is by-passed from supply duct 14 through by-pass duct 30. The position of the valve may be thermostatically controlled in the manner previously indicated and if no cooling is necessary at all, then all air will by-pass the heat exchanger and expansion turbine. If, for any reason, it should be desired to discontinue the operation of the system entirely, this may be accomplished by shutting off valve 29.

It is to be understood that the scope of the invention is not to be limited to the exact embodiments disclosed, but is to be defined within the spirit and scope of the claims appended hereto.

We claim:

1. In a system for air conditioning an aircraft cabin, the combination of a source of compressed air for the cabin, heat exchange means for cooling the compressed air from said source, means for further cooling the air by expansion, and barometrically compensated regenerative further cooling means between said heat exchanger and said expansion cooling means.

2. In a system for air conditioning an aircraft cabin, the combination of a source of compressed air for the cabin, primary heat exchange means for cooling the compressed air from said source, means for further cooling the air by expansion, and barometrically regulated means for discharging a portion of the expanded air to the ambient atmosphere.

3. In a system for air conditioning an aircraft cabin, the combination of a source of compressed air for the cabin, primary heat exchange means for cooling the compressed air from said source, means for further cooling the air by expansion, secondary heat exchange means for regeneratively further cooling the air, and means for varying the cooling performed by said last-named means in response to variations in ambient atmospheric pressure.

4. In a system for air conditioning an aircraft cabin, the combination of a source of compressed air for the cabin, means for conducting a coolant fluid in heat transfer relationship to the compressed air from said source, means for the extraction of work energy from said compressed air by expansion thereof, means for conducting a portion of the expanded air as a regenerative coolant fluid in heat transfer relationship to the compressed air, and barometrically regulated flow control means for said regenerative coolant fluid.

5. A system for air conditioning an aircraft cabin consisting of a source of compressed air for the pressurization of the cabin, a primary heat exchanger for cooling the compressed air from said source, a secondary heat exchanger for further cooling the air, means for conveying a coolant fluid to said primary heat exchanger, expansion means for further cooling the air, and barometrically compensated means for regeneratively cooling the compressed air by conducting a portion of the expanded air to said secondary heat exchanger.

6. In a system for air conditioning an aircraft cabin the combination of a source of compressed air for the cabin, primary heat exchange means for cooling the compressed air from said source, means for further cooling the air by expansion, secondary heat exchange means for regeneratively further cooling the air, means responsive to variations in ambient atmospheric pressure for varying the cooling performed by said secondary exchange means, and means responsive to fluctuations in cabin temperature for varying the aggregate cooling of said primary exchange means, said expansion means and said secondary exchange means.

7. The method of air conditioning the cabin of an aircraft comprising: compressing the air, cooling the air by heat exchange, further cooling the air by work extraction, regeneratively further cooling the air before work extraction by heat exchange with a portion of the air cooled by said work extraction, and barometrically compensating the regenerative cooling for variations in the pressure of the ambient atmosphere.

8. The method of air conditioning the cabin of an aircraft comprising: compressing the air, cooling the air by work extraction, regeneratively further cooling the air before work extraction by heat exchange with a portion of the air cooled by said work extraction, and barometrically compensating the regenerative cooling for variations in the pressure of the ambient atmosphere.

9. The method of air conditioning the cabin of an aircraft comprising: compressing the air, cooling the air by expansion, discharging a portion of the expanded air to the ambient atmosphere, and barometrically compensating said discharge for variations in the pressure of the ambient atmosphere.

10. In a system for air conditioning an aircraft cabin, the combination of: means for supplying compressed air to said cabin, means for cooling the air by expansion, and barometrically regulated means for discharging a portion of the expanded air to the ambient atmosphere.

11. In a system for air conditioning the cabin of an aircraft provided with a means for supplying compressed air thereto, means for cooling the compressed air by expansion prior to its entry into the cabin, and barometrically compensated regenerative heat exchange means upstream of said expansion cooling means.

12. In mechanism for delivering conditioned air to an aircraft cabin, the combination including: a conduit for delivering compressed air to said cabin; means in said conduit for cooling said compressed air; and barometrically regulated means for discharging at least a portion of said cooled air to the ambient atmosphere.

13. A system for conditioning air supplied to an aircraft cabin including: air expansion means, a conduit for delivering the expanded air to the cabin, a conduit connected to said first named conduit for delivering a portion of said expanded air to the atmosphere, and barometrically regulated means for controlling the amount of air which may flow through said last mentioned conduit to the atmosphere.

14. In mechanism for delivering conditioned air to an aircraft cabin, the combination including: a source of compressed air; a first conduit means for delivering compressed air from said source to said cabin; means in said conduit for cooling the air; barometrically controlled air outflow means for discharging air from the cabin to the ambient atmosphere; and second conduit means for discharging a portion of the air into the cabin in proximity to said outflow means.

15. In mechanism for delivering conditioned air to an aircraft cabin, the combination including: a conduit for delivering compressed air to said cabin; means in said conduit for cooling the air; and barometrically controlled air outflow means for discharging a portion of said air direct to the ambient atmosphere.

HOMER J. WOOD.
HORACE R. ALEXANDER.

REFERENCES CITED

The following references are of record in the file of this patent:

UNITED STATES PATENTS

| Number | Name | Date |
|---|---|---|
| 2,002,057 | Gregg | May 21, 1935 |
| 2,316,237 | Grunert et al. | Apr. 13, 1943 |
| 2,316,416 | Gregg | Apr. 13, 1943 |
| 2,391,838 | Kleinhans | Dec. 25, 1945 |